(12) United States Patent
Semba et al.

(10) Patent No.: US 10,028,015 B2
(45) Date of Patent: Jul. 17, 2018

(54) SIGNAL PROCESSING APPARATUS AND SIGNAL PROCESSING METHOD

(71) Applicant: YAMAHA CORPORATION, Hamamatsu-shi, Shizuoka (JP)

(72) Inventors: Youji Semba, Iwata (JP); Hiroyuki Fujita, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/655,420

(22) PCT Filed: Dec. 26, 2013

(86) PCT No.: PCT/JP2013/084938
§ 371 (c)(1),
(2) Date: Jun. 25, 2015

(87) PCT Pub. No.: WO2014/104210
PCT Pub. Date: Jul. 3, 2014

(65) Prior Publication Data
US 2015/0326914 A1    Nov. 12, 2015

(30) Foreign Application Priority Data

Dec. 28, 2012  (JP) ................................. 2012-287762
Nov. 27, 2013  (JP) ................................. 2013-244701

(51) Int. Cl.
*H04N 7/18*     (2006.01)
*H04N 21/439*   (2011.01)
(Continued)

(52) U.S. Cl.
CPC ..... *H04N 21/4398* (2013.01); *H04N 21/2368* (2013.01); *H04N 21/439* (2013.01);
(Continued)

(58) Field of Classification Search
CPC combination set(s) only.
See application file for complete search history.

(56) References Cited

U.S. PATENT DOCUMENTS 8,316,052 B2 *  11/2012  Hao .................. G06F 17/30038
                                                    707/783
8,505,054 B1 *   8/2013  Kirley ................. H04N 21/436
                                                    725/74
(Continued)

FOREIGN PATENT DOCUMENTS

JP    2004357002 A    12/2004
JP    2007300403 A    11/2007
(Continued)

OTHER PUBLICATIONS

International Search Report issued in PCT/JP2013/084938, dated Apr. 8, 2014. English translation provided.

*Primary Examiner* — Alexander Gee
(74) *Attorney, Agent, or Firm* — Rossi, Kimms & McDowell LLP (57) ABSTRACT

A signal processing apparatus includes: a signal input unit that receives inputs of a plurality of signals, the plurality of signals having a first temporal order different from each other; a transmission unit that sequentially transmits the plurality of signals as data to outside of the signal processing apparatus; and a reception unit that receives a plurality of output signals from outside of the signal processing apparatus, the plurality of output signals being generated by processing the data, the plurality of output signals having a second temporal order corresponding to the first temporal order.

4 Claims, 9 Drawing Sheets

(51) Int. Cl.
   *H04N 21/436*     (2011.01)
   *H04N 21/4363*    (2011.01)
   *H04N 21/2368*    (2011.01)
   *H04N 21/81*      (2011.01)

(52) U.S. Cl.
   CPC . *H04N 21/43615* (2013.01); *H04N 21/43635* (2013.01); *H04N 21/8106* (2013.01)

(56)             References Cited

U.S. PATENT DOCUMENTS

| | | | |
|---|---|---|---|
| 2007/0130610 A1* | 6/2007 | Aarnio | H04H 40/27 |
| | | | 725/134 |
| 2007/0253564 A1* | 11/2007 | Katayama | H04S 3/008 |
| | | | 381/63 |
| 2007/0285568 A1* | 12/2007 | Kurose | H04N 5/44513 |
| | | | 348/563 |
| 2008/0151119 A1 | 6/2008 | Suzuki | |
| 2008/0170500 A1* | 7/2008 | Ito | H04L 1/0018 |
| | | | 370/235 |
| 2011/0255397 A1* | 10/2011 | Kadakia | H04L 41/0672 |
| | | | 370/216 |

FOREIGN PATENT DOCUMENTS

| | | | |
|---|---|---|---|
| JP | 2008158220 A | 7/2008 | |
| JP | 2008236694 A | 10/2008 | |

* cited by examiner

SIGNAL PROCESSING APPARATUS AND SIGNAL PROCESSING METHOD

TECHNICAL FIELD

The present invention relates to a signal processing apparatus that performs predetermined processing on an input signal and outputs the signal as an output signal, and a signal processing method.

Priority is claimed on Japanese Patent Application No. 2012-287762, filed Dec. 28, 2012, and Japanese Patent Application No. 2013-244701, filed Nov. 27, 2013, the contents of which are incorporated herein by reference.

BACKGROUND ART

Generally, a receiver has a decoder function to decode content data and output it as a video signal or an audio signal to various devices (for example, a speaker) (for example, refer to Patent Document 1). Moreover, the receiver also has an amplifier function to amplify the audio signal, a selector function to change over a target to which video or audio is input and output, and a correction function to adjust a frequency characteristic or the like of the audio signal.

Figure 1:
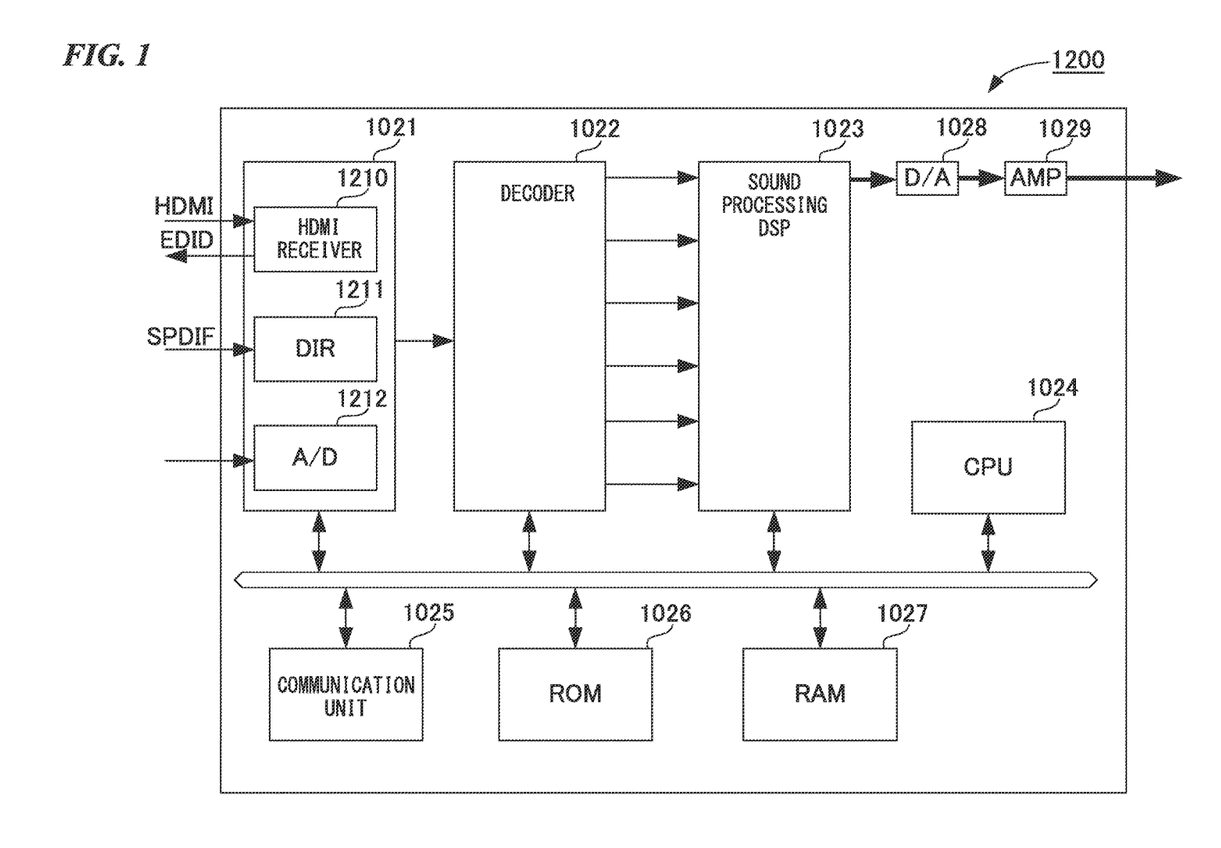
FIG. 1 is a block diagram showing a configuration of a receiver in a related art.

FIG. 1 is a block diagram showing a configuration of a receiver 1200 in a related art. The receiver 1200 includes an input unit 1021, a decoder 1022, a sound processing DSP 1023, a CPU 1024, a communication unit 1025, a ROM 1026, a RAM 1027, a D/A conversion unit 1028, and an amplifying unit (AMP) 1029.

The input unit 1021 functionally includes an HDMI (High Definition Multimedia Interface) (registered trademark) receiver 1210, a DIR (Digital audio Interface Receiver) 1211, and an A/D conversion unit 1212.

The DIR 1211 receives an input of a digital audio signal (a signal conforming to the standard of S/PDIF) from a player 1300 (refer to FIG. 2), and outputs the signal to the decoder 1022. The A/D conversion unit 1212 receives an input of an analog audio signal. The A/D conversion unit 1212 converts the analog audio signal into a digital audio signal, and outputs it to the decoder 1022. The HDMI receiver 1210 receives an HDMI signal from the player 1300 (refer to FIG. 2).

Figure 2:
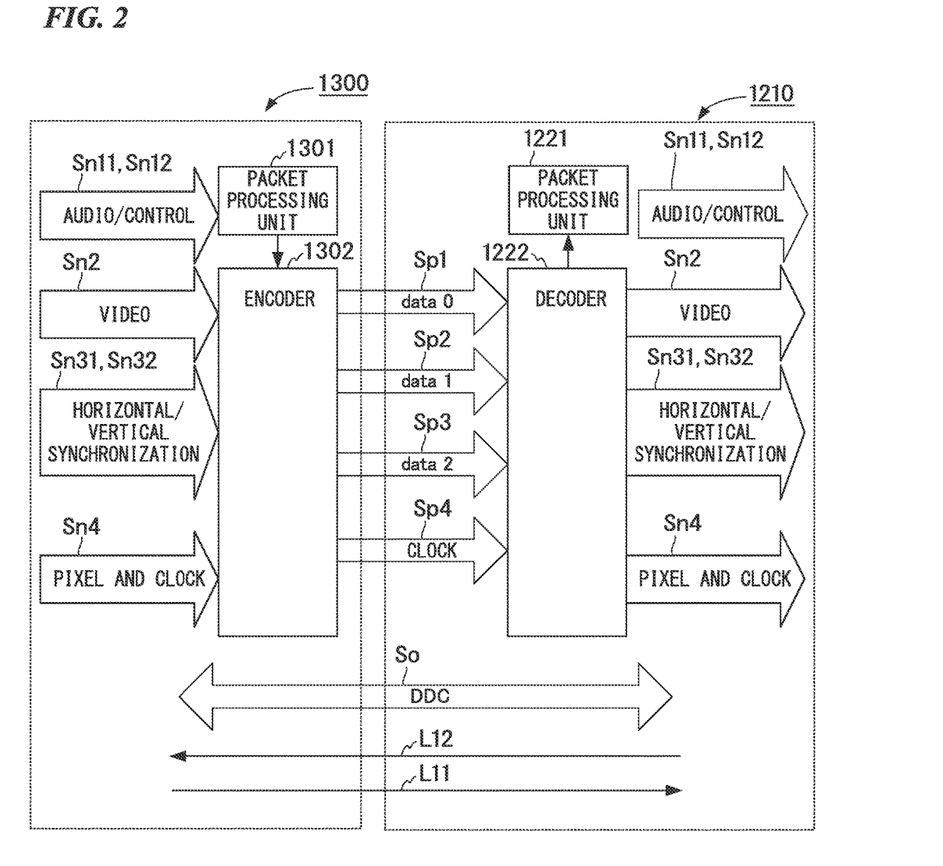
FIG. 2 shows an input and output relation of various signals in an HDMI in the related art.

FIG. 2 shows an input and output relation of various signals in the HDMI. The HDMI receiver 1210 uses a DDC (Display Data Channel) signal So of the HDMI to output processable information (EDID: Extended Display Identification Data) indicating a processable signal by the own device to the player 1300. Moreover, the receiver 1210 receives the HDMI signal from the player 1300. The HDMI signal includes an audio signal (a compressed audio signal) Sn11, a control signal Sn12, a video signal Sn2, a horizontal synchronization signal Sn31, a vertical synchronization signal Sn32, and a pixel and clock Sn4. The HDMI has a CEC (Consumer Electronics Control) line L11 for performing complicated control between devices, and an HPD (Hot-Plug-Detect) line L12 for detecting whether the device is in a connected state or in a disconnected state. A decoder 1222 outputs the decoded video signal Sn2, the horizontal synchronization signal Sn31, the vertical synchronization signal Sn32, and the pixel and clock Sn4 to an external display device. A packet processing unit 1301 of the player 1300 packetizes the audio signal Sn11 and the control signal Sn12. An encoder 1302 synchronizes the video signal Sn2 with the packetized audio signals and the packetized control signals to perform encoding to three data signals Sp1 to Sp3 and one clock signal Sp4. A packet processing unit 1221 extracts the packetized compressed audio signals and control signals from the HDMI signal received by the decoder 1222, and performs processing to restore the packetized compressed audio signals and control signals to the compressed audio signal Sn11 and control signal Sn12. The restored compressed audio signal Sn11 and control signal Sn12 are output to the decoder 1022.

The decoder 1022 includes a DSP (Digital Signal Processor). The decoder 1022 decompresses the compressed audio signal to decode it to a multichannel audio signal. The decoder 1022 also performs processing to extend, for example, a stereo-channel audio signal to a multichannel audio signal such as 5.1 channel. The decoder 1022 outputs the generated audio signal to the sound processing DSP 1023.

The sound processing DSP 1023 performs predetermined sound processing on the audio signal. For example, the sound processing DSP 1023 adjusts the audio signal so as to be in an optimum sound field environment suitable for a listening position, by adjusting the frequency characteristic or the like.

The D/A conversion unit 1028 converts the audio signal having been subjected to the sound processing, into an analog audio signal. The amplifying unit 1029 amplifies the analog audio signal and outputs the amplified signal to the speaker.

In such a receiver 1002, the CPU 1024 reads out firmware stored in the ROM 1026, to the RAM 1027 being a work memory, and causes the decoder 22 and the sound processing DSP 1023 to execute various processing as described above.

The receiver 1002 receives the new firmware via the communication unit 1025 to update the firmware in the ROM 1026. According to such processing, the receiver 1002 can realize new signal processing.

PRIOR ART DOCUMENT

Patent Document

[Patent Document 1] Japanese Unexamined Patent Application, First Publication No. 2007-300403

SUMMARY OF THE INVENTION

Problem to be Solved by the Invention

However, the DSP often has processing capacity matched with a format assumed at the time of factory shipment. Therefore, even if the firmware is updated, new signal processing exceeding the processing capacity of the hardware of the DSP cannot be performed.

An exemplary object of the present invention is to provide a signal processing apparatus and a signal processing method that can realize new signal processing, which has not been easily realized by the apparatus according to the related art.

Means for Solving the Problem

A signal processing apparatus according to an aspect of the present invention includes: a signal input unit that receives inputs of a plurality of signals, the plurality of signals having a first temporal order different from each other; a transmission unit that sequentially transmits the plurality of signals as data to outside of the signal processing apparatus; and a reception unit that receives a plurality of output signals from outside of the signal processing apparatus, the plurality of output signals being generated by processing the data, the plurality of output signals having a second temporal order corresponding to the first temporal order.

In this way, the signal processing apparatus according to the aspect of the present invention outputs an input signal as data to the outside, and receives an output signal (for example, an audio signal) generated by processing the data Therefore, it is possible to realize processing exceeding the hardware processing capacity of the own apparatus. For example, such a case is assumed here that a new audio format that has not been present at the time of shipment of the signal processing apparatus from the factory is formulated, and the signal processing apparatus does not have the processing capacity for a signal of that audio format. Even in this case, the input signal is transmitted to an external device that can process the audio format signal, to cause the external device to generate an audio signal, thereby enabling to handle the new audio format.

A signal processing method for a signal processing apparatus, according to an aspect of the present invention includes: receiving inputs of a plurality of signals, the plurality of signals having a first temporal order different from each other; sequentially transmitting the plurality of signals as data to outside of the signal processing apparatus; and receiving a plurality of output signals from outside of the signal processing apparatus, the plurality of output signals being generated by processing the data, the plurality of output signals having a second temporal order corresponding to the first temporal order.

Effect of the Invention

According to the present invention, new signal processing that has not been easily performed by the apparatus in the related art can be realized.

EMBODIMENTS FOR CARRYING OUT THE INVENTION

Figure 3:
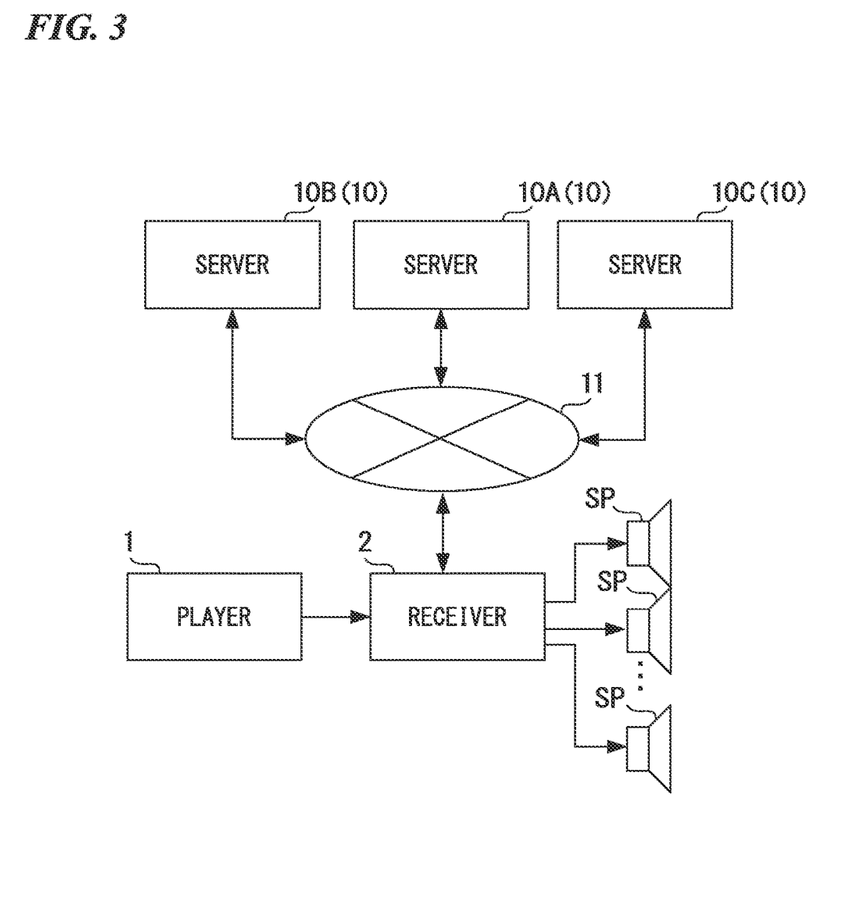
FIG. 3 is a schematic diagram showing a configuration of a signal processing system according to an embodiment of the present invention.

FIG. 3 is a schematic diagram showing a configuration of a signal processing system according to an embodiment of the present invention. The signal processing system shown in FIG. 3 includes a player 1, a receiver 2, a plurality of speakers SP, a network 11, and a plurality of servers (three servers 10A 10B, and 10C in FIG. 3). Hereunder, three servers 10A, 10B, and 10C may be referred to as servers 10 when the respective servers are not discriminated from each other.

The receiver 2 is connected to the player 1 and the respective speakers SP. The receiver 2 is connected to the servers 10A, 10B, and 10C via the network 11.

The servers 10A, 10B, and 10C may be servers independent of each other, and may be a kind of cloud in a cloud computing system. The cloud means an area in which a server group is arranged in a cloud computing environment.

The receiver 2 shown in FIG. 3 may be an example of the signal processing apparatus. The receiver 2 receives a signal of contents from the player 1. The receiver 2 transmits a compressed audio signal of the signal of the contents to the server 10, and causes the server 10 to execute processing of converting it into an audio signal that can be output to the speakers SP. The receiver 2 receives the processed audio signal from the server 10 and supplies it to the speakers SP.

Figure 4:
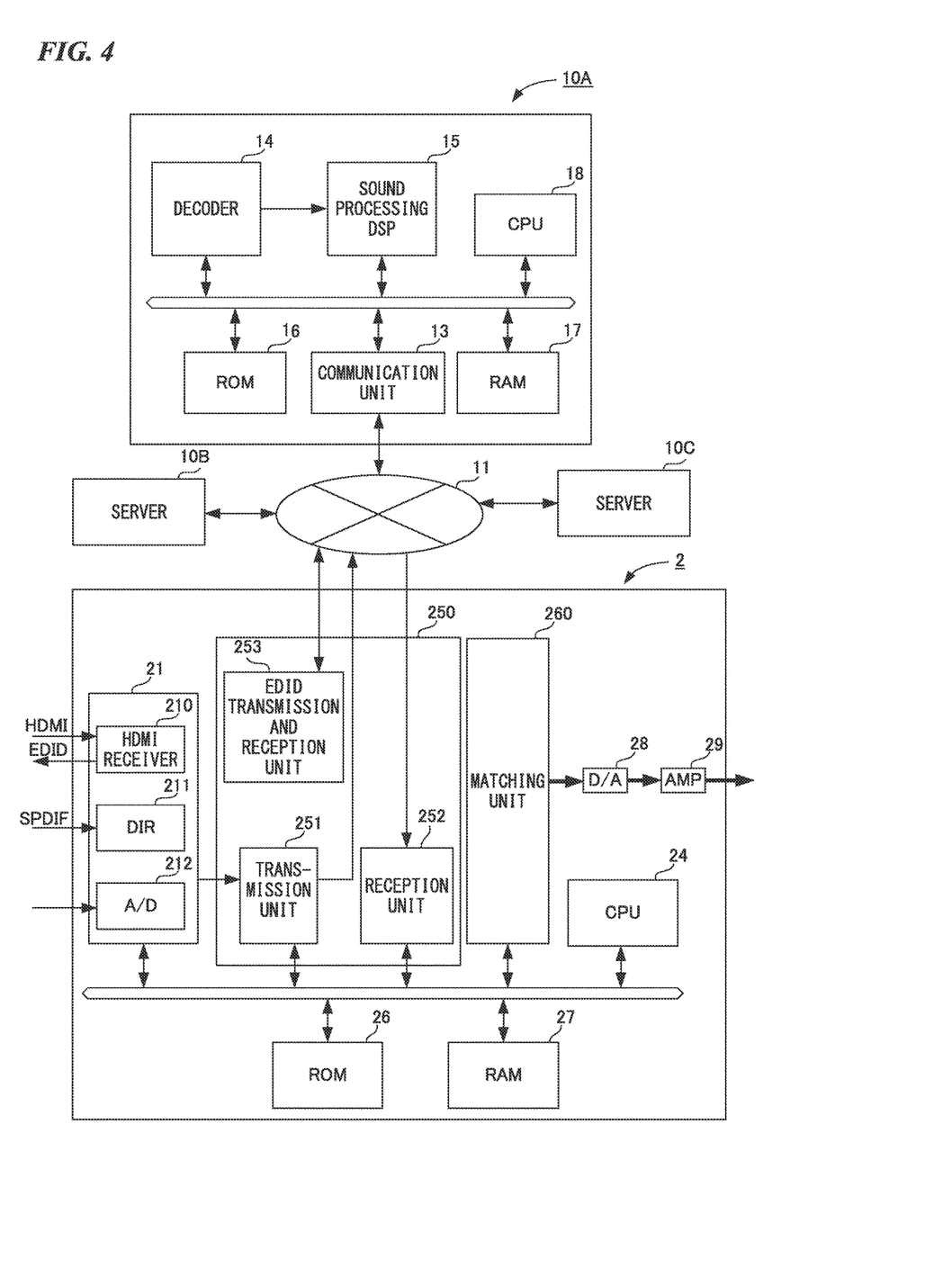
FIG. 4 is a block diagram showing a configuration of a receiver and a server shown in FIG. 1.

FIG. 4 is a block diagram showing details of the configuration of the receiver 2 and the server 10A. Because the servers 10A, 10B, and 10C have the same configuration, details of the configurations of the servers 10B and 10C are omitted in FIG. 4.

The receiver 2 includes an input unit 21, a communication unit 250, a matching unit 260, a CPU 24, a ROM (storage unit) 26, a RAM (storage unit) 27, a D/A conversion unit 28, and an amplifying unit (AMP) 29. The ROM 26 may be a rewritable Flash ROM.

The CPU 24 reads an operation program (firmware) stored in the ROM 26 into the RAM 27, and performs overall control of the receiver 2 based on the operation program.

The input unit 21 may be an example of a signal input unit. The input unit 21 functionally includes an HDMI receiver 210, a DIR 211, and an A/D conversion unit 212. The HDMI receiver 210 may be an example of the notification unit. The DIR 211 receives an input of a digital audio signal (a signal conforming to the standard of SPDIF) from the player 1, and outputs the signal to the communication unit 250. The A/D conversion unit 212 receives an input of an analog audio signal from outside (the player 1 or the like). The A/D conversion unit 212 converts the analog audio signal into a digital audio signal, and outputs the digital audio signal to the communication unit 250.

Figure 5:
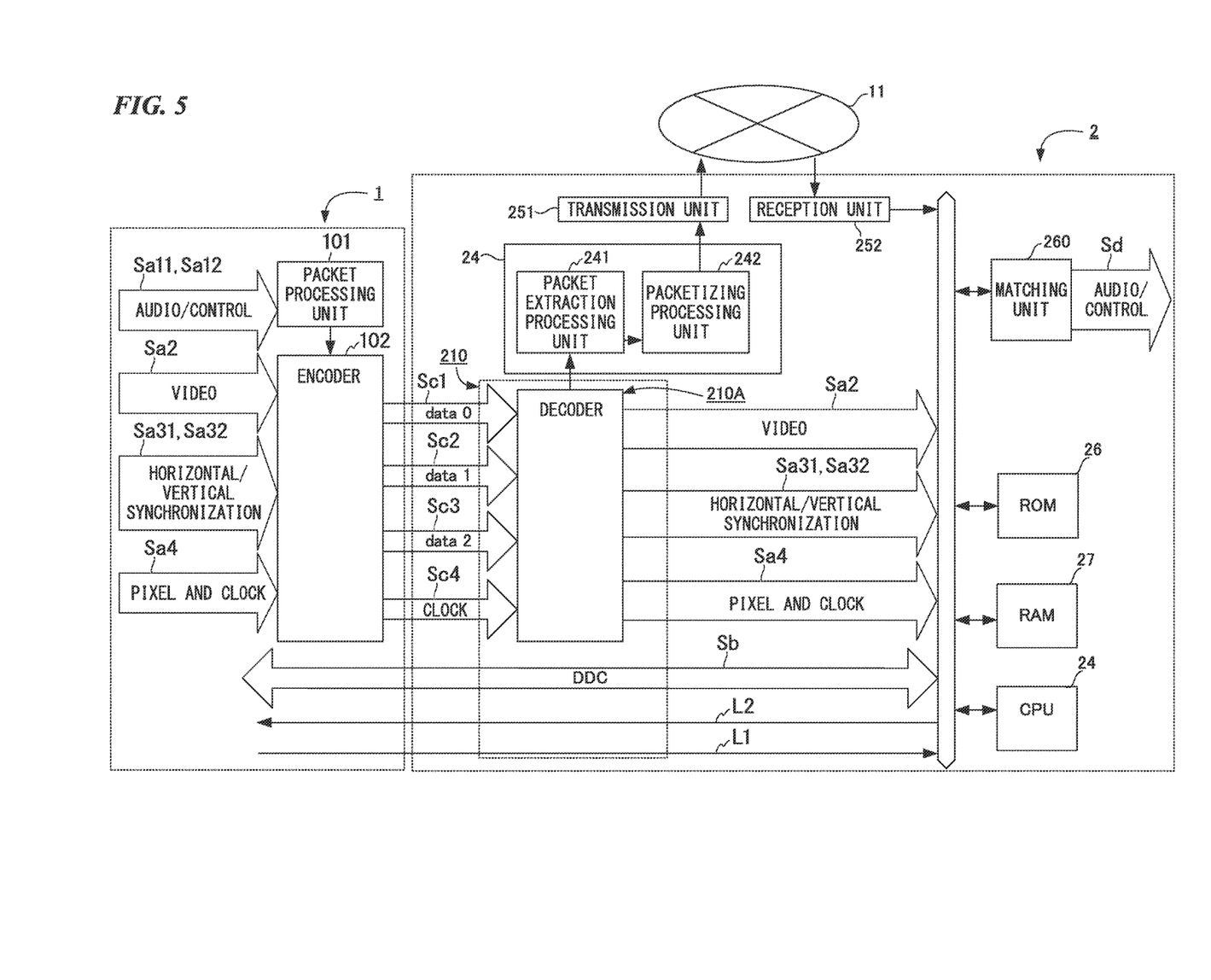
FIG. 5 is a diagram showing an input and output relation of various signals in the HDMI in the embodiment of the present invention.
Figure 6:
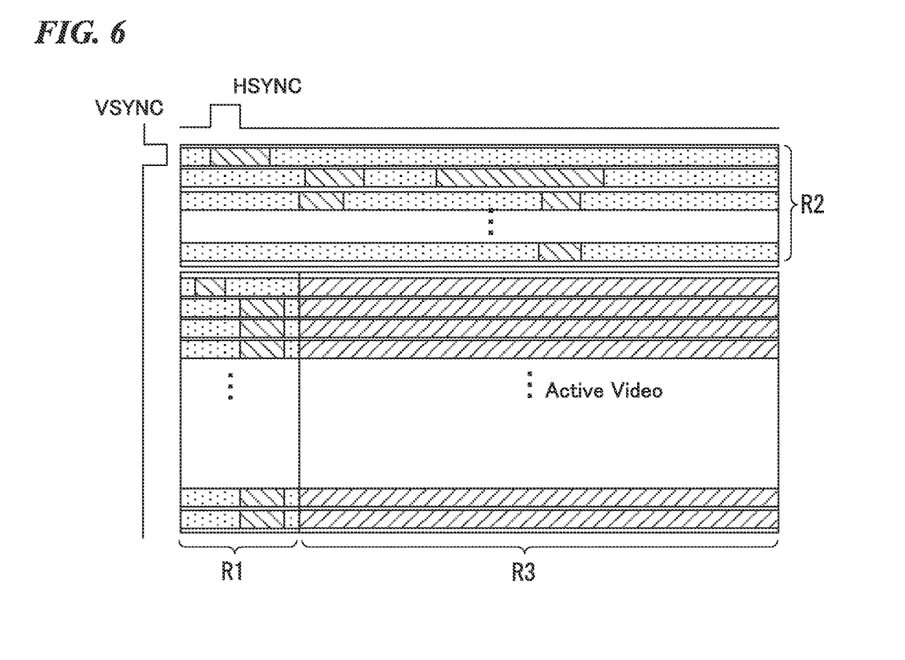
FIG. 6 is a diagram showing a configuration example of an HDMI signal in a TMDS transmission system in the embodiment of the present invention.

Hereunder, an example in which the input unit 21 receives the HDMI signal is described. FIG. 5 shows an input and output relation of various signals in the HDMI receiver 210. FIG. 6 shows a configuration example of the HDMI signal in a TMDS (Transition Minimized Differential Signaling) transmission method. In FIG. 6, an example is shown in which a video signal having 1920 pixels (width) by 1080 lines (height) is transmitted.

As shown in FIG. 6, the HDMI signal includes a horizontal blanking region R1, a vertical blanking region R2, and an active video region (Active Video) R3. In the example shown in FIG. 6, the active video region includes 1920 pixels by 1080 lines. There are three types of sections in the transmission data, that is, a video data period (an area shown by right upward diagonal lines in FIG. 6), a data island period (an area shown by left upward diagonal lines in FIG. 6), and a control period (an area shown by a spotted pattern in FIG. 6). The video data period corresponds to the video signal, and is allocated to the active video region R3. In the example in FIG. 6, as the video signal, effective pixel data for 1920 pixels (picture elements) by 1080 lines constituting uncompressed image data for one screen is transmitted. The audio signal (the compressed audio signal) is arranged in the horizontal blanking region R1. The control signal is arranged in the vertical blanking region R2.

The HDMI receiver 210 first outputs processable information (EDID) indicating a signal that can be processed by the own device (for example, an audio format) to the player 1. The EDID is stored in the ROM 26 at the time of factory shipment. The CPU 24 reads the EDID stored in the ROM 26. The HDMI receiver 210 notifies the player 1 of the EDID by using a DDC signal Sb, in response to a command from the CPU 24. The player 1 transmits the HDMI signal having the audio format determined as been processable by the receiver 2, according to the EDID notified from the receiver 2. The HDMI receiver 210 receives the HDMI signal from the player 1.

The HDMI signal includes an audio signal (a compressed audio signal such as AAC) Sa11, a control signal Sa12, a video signal Sa2, a horizontal synchronization signal Sa31, a vertical synchronization signal Sa32, and a pixel and clock Sa4. The HDMI has a CEC line L1 for performing complicated control between devices, and an HPD line L2 for detecting whether the device is in a connected state or in a disconnected state. A packet processing unit 101 of the player 1 packetizes the audio signal Sa11 and the control signal Sa12. An encoder function unit 102 of the player 1 synchronizes the video signal Sa2 with the packetized audio signals and the packetized control signals by using the horizontal synchronization signal Sa31 the vertical synchronization signal Sa32, and the pixel and clock Sa4, to perform encoding to three data signals Sc1 to Sc3 and one clock signal Sc4, and transmits them to the receiver 2. The clock signal Sc4 corresponds to the pixel and clock Sa4. The encoder function unit 102 transmits image data, auxiliary data, and control data by the three data signals Sc1 to Sc3. The image data includes the video signal Sa2. The auxiliary data includes the packetized audio signals and the packetized control signals. The control data includes the horizontal synchronization signal Sa31 and the vertical synchronization signal Sa32. A decoder function unit 210A in the HDMI receiver 210 receives the three data signals Sc1 to Sc3 and the clock signal Sc4. The decoder function unit 210A decodes these signals to obtain the packetized audio signals, the packetized control signals, the video signal Sa2, the horizontal synchronization signal Sa31, the vertical synchronization signal Sa32, and the pixel and clock Sa4.

As shown in FIG. 4 and FIG. 5, the communication unit 250 functionally includes a transmission unit 251, a reception unit 252, and an EDID transmission and reception unit 253. The EDID transmission and reception unit 253 may be an example of an information communication unit. As shown in FIG. 5, the CPU 24 functionally includes a packet extraction processing unit 241 and a packetizing processing unit 242.

The packet extraction processing unit 241 extracts the packetized audio signal (the compressed audio signal) Sa11 and control signal Sa12 of the HDMI signal received by the HDMI receiver 210. The receiver 2 transmits the video signal Sa2, the synchronization signals Sa31 and Sa32, and the pixel and clock Sa4 to a video display device (not shown) (for example, a television).

The compressed audio signal extracted by the packet extraction processing unit 241 has a temporal order. The packetizing processing unit 242 converts the compressed audio signal into a packet having a predetermined data length. The CPU 24 transmits the packet to the respective servers (for example, the server 10A) via the transmission unit 251. The packet to be transmitted includes information indicating a required number of channels, information indicating a required sound processing content (low-pitched sound enhancement, clear dialogue, or the like), and information of packet number and the like. The packet includes the packet number corresponding to the temporal order held in the compressed audio signal. The required number of channels and the required sound processing content are determined based on the number of speaker terminals of the receiver 2 or the number of speakers connected to the receiver 2. A user may operate an operating unit (not shown) of the receiver 2 to determine the required number of channels and the required sound processing content.

Every time the CPU 24 receives a compressed audio signal having a size that can be converted into a packet, the CPU 24 converts the compressed audio signal into a packet and transmits the packet to the server 10. In this case, it is desired that the CPU 24 transmits the next packet to the server 10 without waiting for reception of a packet corresponding to the transmitted packet. When the CPU 24 transmits the next packet to the server 10 after having received the packet corresponding to the transmitted packet (a packet corresponding to the audio signal that can be output to the speaker SP), supply of the audio signal to the speaker SP may become sluggish.

Figure 7:
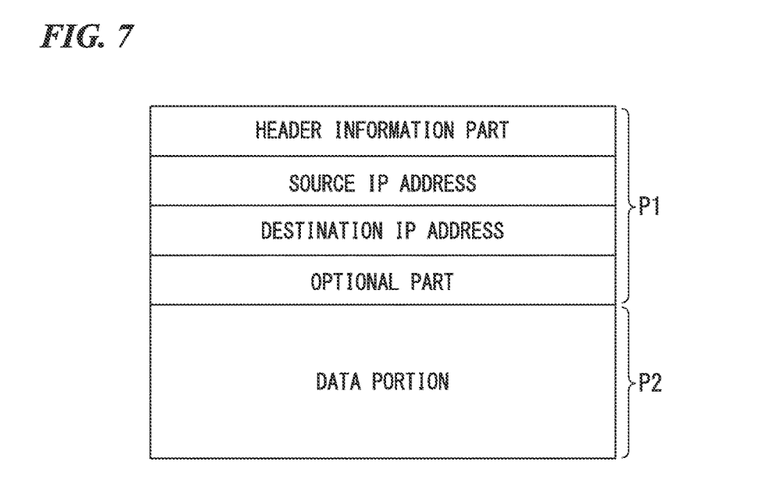
FIG. 7 shows a structure of a packet (packet to be transmitted) in the embodiment of the present invention.

FIG. 7 shows a structure of a packet (a packet to be transmitted) generated by the packetizing processing unit 242. The structure of the packet includes an IP header portion P1 and a data portion P2 carried by an IP packet.

The IP header portion P1 includes a header information part, a source IP address, a destination IP address, and an optional part. The header information part includes information of a version, a header length, and the like. The optional part includes the packet number as information indicating the temporal order.

The data portion P2 is packetized every time the compressed audio signal having a size that can be packetized is received. For example, it is packetized with a predetermined separation of for example, screen, time, or size. Even in the case of an unknown format in the own device, the data portion P2 is packetized with a predetermined separation (for example, in the case of the compressed audio signal included in the blanking region of the HDMI video data, the compressed audio signal corresponding to the image data for one screen.

The CPU 24 transmits the packet to one server (for example, the server 10A) or to a plurality of servers (for example, servers 10A to 10C). For example, the CPU 24 may transmit the first packet to the server 10A, the next packet to the server 10B, and the following packet to the server 10C. The CPU 24 may transmit the subsequent packet to a server other than the servers 10A to 10C. If there is a server that has returned a packet corresponding to the transmitted packet, the CPU 24 may transmit a new packet to the server.

As shown in FIG. 4, the server 10A includes a communication unit 13, a decoder 14, a sound processing DSP 15, a ROM 16, a RAM 17, and a CPU 18. The ROM 16 may be a rewritable Flash ROM.

The CPU 24 reads the operation program stored in the ROM 16 into the RAM 17, and performs overall control of the server 10A based on the operation program.

The communication unit 13 receives the packet from the receiver 2. The CPU 18 extracts the compressed audio signal from the received packet, and inputs it to the decoder 14. Moreover, the CPU 18 sets a decoding content with respect to the decoder 14 according to the information indicating the required number of channels included in the packet. Furthermore, the CPU 18 sets a sound processing content with respect to the sound processing DSP 15 according to the information indicating the required sound processing content included in the packet.

The decoder 14 generates a digital audio signal (PCM signal) from the input compressed audio signal according to the setting of the CPU 18. The decoder 14 includes a DSP corresponding to various types of audio formats such as AAC (registered trademark), Dolby Digital (registered trademark), and DTS (registered trademark). The decoder 14 decodes these compressed audio signals to multichannel audio signals. Moreover, when the compressed audio signal is in the audio format corresponding to a stereo channel, the decoder 14 extends it to a multichannel audio signal such as 5.1 channel or 7.1 channel. The decoder 14 outputs the generated multichannel audio signal to the sound processing DSP 15.

The sound processing DSP 15 performs the predetermined sound processing with respect to the input multichannel audio signal according to the setting by the CPU 18. For example, the sound processing DSP 15 makes sound clear, enhances low-pitched sound, converts sound to pseudo stereophony, or adjusts sound so as to be in an appropriate sound field environment suitable for a listening position.

The CPU 18 converts the multichannel audio signal having been subjected to the sound processing, into a packet. The structure of the packet is the same as that shown in FIG. 7. The CPU 18 adds to the packet (the packetized multichannel audio signal) the packet number the same as the packet number added to the packet received from the receiver 2. The CPU 18 transmits the packet added with the packet number, to the receiver 2 via the communication unit 13.

The reception unit 252 of the receiver 2 receives a packet from the server 10A (and other servers). The received packet is input to the matching unit 260. As described above, each of the plurality of packets may be transmitted to different servers. Therefore, the communication unit 250 may not receive the packets in the same order as an order that the corresponding packet has been transmitted. Consequently, the matching unit 260 refers to the packet number of the received packet and outputs (arranges) the packetized multichannel audio signals in order of the packet number. According to such processing, the matching unit 260 matches the order of outputting the audio signals.

The method of matching the order of outputting the multichannel audio signals is not limited thereto, and for example, processing described below may be performed. That is to say, the CPU 24 adds a sequence number (or a time stamp; similarly hereunder) to the packet, instead of the packet number. The matching unit 260 transmits the packet added with the sequence number, to the server 10. The transmission unit 251 receives the packet added with the sequence number from the server 10. The matching unit 260 refers to the sequence number of the received packet, and outputs (arranges) the multichannel audio signals in order of the sequence number. The packet number, the sequence number, and the time stamp may be an example of an identifier.

The matching unit 260 outputs the multichannel audio signals having the temporal order matched with the order of output, to the D/A conversion unit 28 (shown by a signal Sd in FIG. 5). The D/A conversion unit 28 converts the multichannel audio signals into analog signals. The amplifying unit 29 amplifies the analog signals, and outputs the analog signals to the speaker SP.

In this way, the receiver 2 causes the server 10 to execute the signal processing, and outputs the audio signal generated by the server 10. Therefore the receiver 2 can always output the audio signal having been subjected to the latest signal processing (the latest decoding method, the latest sound processing, or the like).

Hereunder, a signal processing system according to various modified examples of the embodiment of the present invention will be described.

First Modified Example

In the above described embodiment, the CPU 24 reads the EDID stored in the ROM 26 at the time of factory shipment, and causes the HDMI receiver 210 to output the EDID to notify the player 1 of the EDID. On the other hand, in a first modified example, the receiver 2 receives the EDID from outside of the receiver 2 to notify the player 1 of the EDID.

Specifically, the CPU 24 downloads the EDID corresponding to the latest audio format from the server 10A (or other servers) via the EDID transmission and reception unit 253. The CPU 24 stores the downloaded EDID in the RAM 27 (or the ROM 26). The CPU 24 causes the HDMI receiver 210 to notify the player 1 of the latest EDID stored in the RAM 27. As a result, the EDID indicating that the latest audio format can be processed, is always notified to the player 1. Moreover, the receiver 2 can receive the HDMI signal corresponding to the latest audio format. The EDID transmission and reception unit 253 may receive from outside as the EDID, information including information indicating a signal that cannot be processed by the receiver 2 (for example, an audio format that cannot be processed by the receiver 2). The EDID transmission and reception unit 253 may receive from outside as the EDID, information indicating only a signal that cannot be processed by the receiver 2.

That is to say, the EDID transmission and reception unit 253 may notify the player 1 of the EDID indicating that the signal of the audio format, which cannot be processed by the receiver 2, can be processed, and may receive a signal of the new audio format from the player 1.

Second Modified Example

Figure 8:
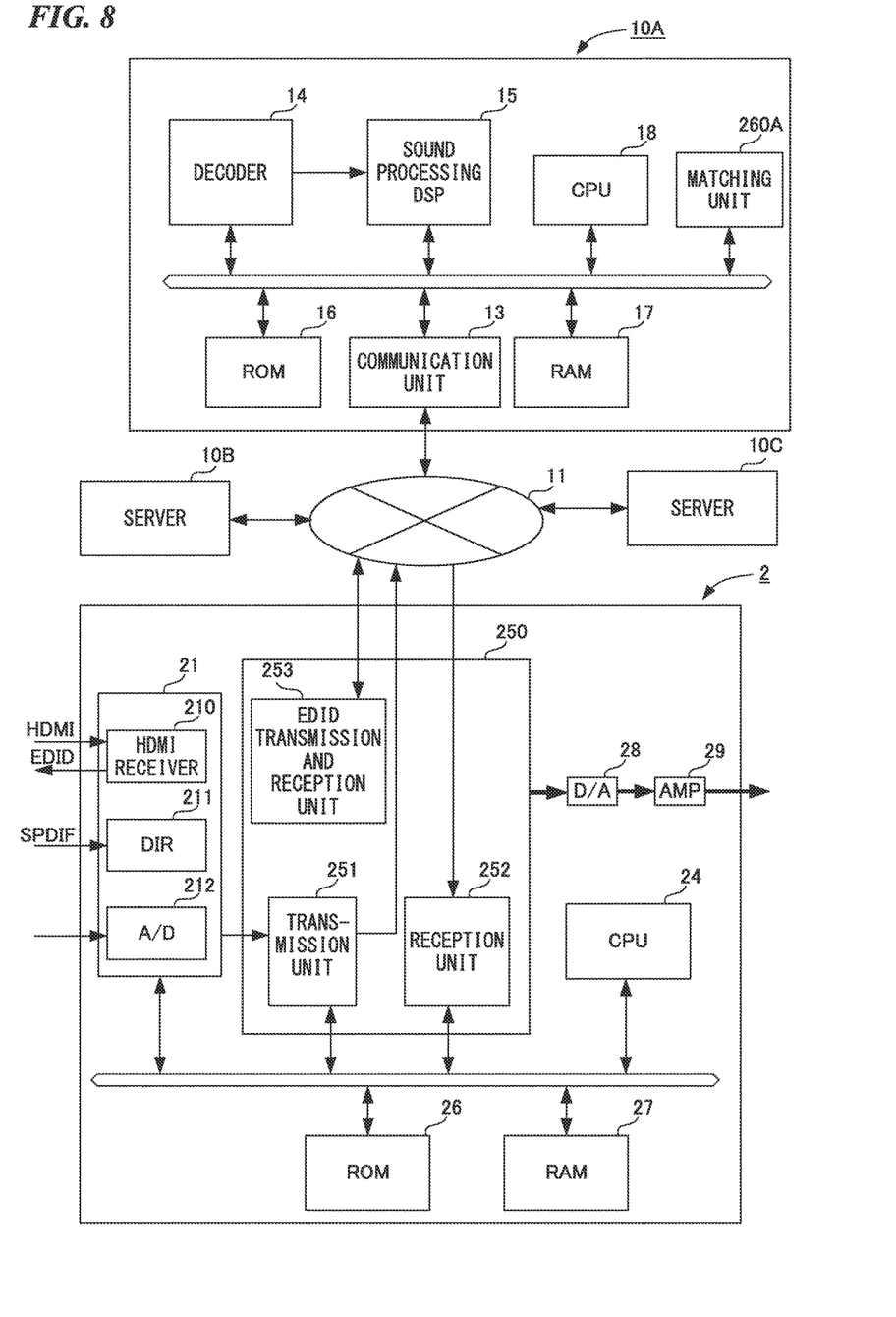
FIG. 8 is a block diagram showing configurations of a receiver and a server according to a second modified example of the embodiment of the present invention.

FIG. 8 is a block diagram showing configurations of a receiver 2 and servers 10A to 10C according to a second modified example. Parts whose configuration shown in FIG. 8 are in common with the configuration shown in FIG. 4, are denoted by the same reference symbols and description thereof is omitted.

In the second modified example, the server 10A includes a matching unit 260A. Every time a CPU 24 of the receiver 2 receives a compressed audio signal having a size that can be converted into a packet, the CPU 24 converts the compressed audio signal into a packet, and transmits the packet only to the server 10A. At this time, the receiver 2 need not add a packet number to the packet.

A CPU 18 of the server 10A performs processing of a part of the packet received from the receiver 2 by the own device, and transfers other packets to other servers (for example, the servers 10B or 10C).

A case in which the packet number is not added to the packet received from the receiver 2 by the CPU 18 of the server 10A is described. In this case, the CPU 18 of the server 10A adds to the packet a packet number having the same order as the order of the reception of the packet from the receiver 2. The CPU 18 transfers the packet added with the packet number to other servers.

The CPU 18 of the server 10A converts the multichannel audio signal processed by a decoder 14 and a sound processing DSP 15 of the own device into the packet. At this time, the CPU 18 adds to the packet (the packetized multichannel audio signal) the same packet number as the packet number added to the compressed audio signal before conversion. The CPU 18 inputs the multichannel audio signal added with the packet number, to the matching unit 260A. Moreover, the CPU 18 of the server 10A receives the packet corresponding to the multichannel audio signal processed by other servers (the servers 10A and 10B), and inputs the packet to the matching unit 260A. The matching unit 260A arranges the respective packets in order of the packet number, and matches an order of outputting the packet. The CPU 18 transmits the packet with the output order being matched by the matching unit 260A, to the receiver 2.

In this way, one server (in this case, the server 10A) may receive a packet from the receiver 2 as a representative, disperse the processing of the packet to a plurality of servers including the own device, and return the packet to the receiver 2 with the output order being matched.

Third Modified Example

Figure 9:
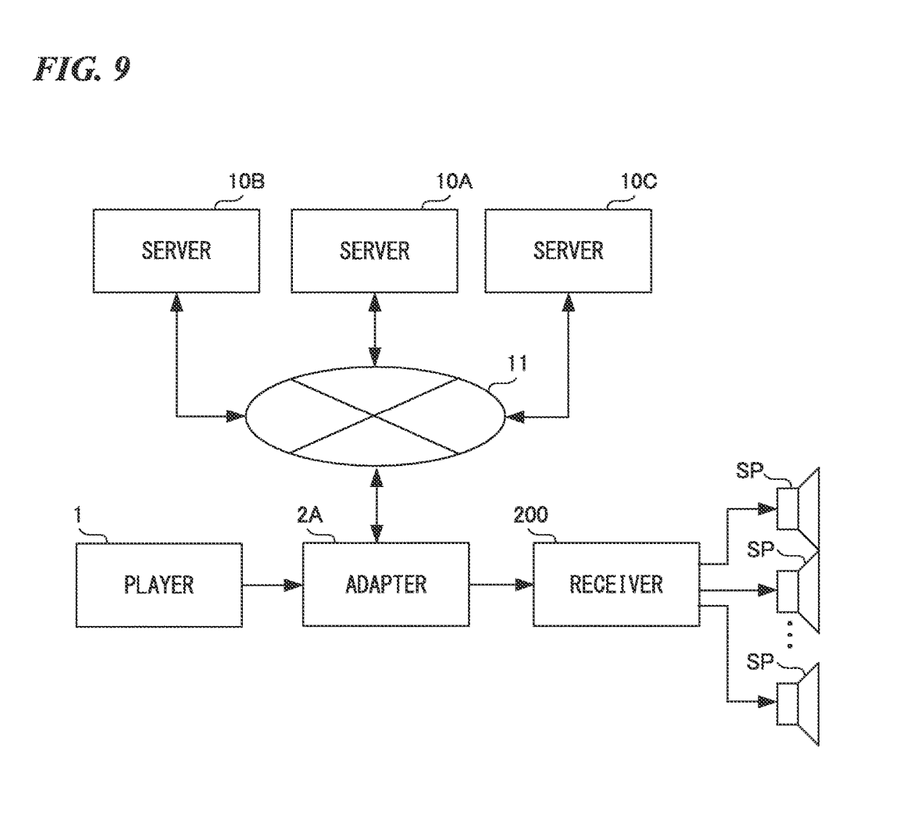
FIG. 9 is a schematic diagram showing a configuration of a signal processing system according to a third modified example of the embodiment of the present invention.

FIG. 9 is a schematic diagram showing a configuration of a signal processing system according to a third modified example. The signal processing system shown in FIG. 9 includes a player 1, an adapter 2A, a receiver 200, a plurality of speakers SP, a network 11, and a plurality of servers (in FIG. 9, three servers 10A, 10B, and 10C).

The adapter 2A is connected to the player 1 and the receiver 200. The receiver 200 is connected to respective speakers SP. Moreover, the adapter 2A is connected to the servers 10A, 10B, and 10C via a network 11.

Figure 10:
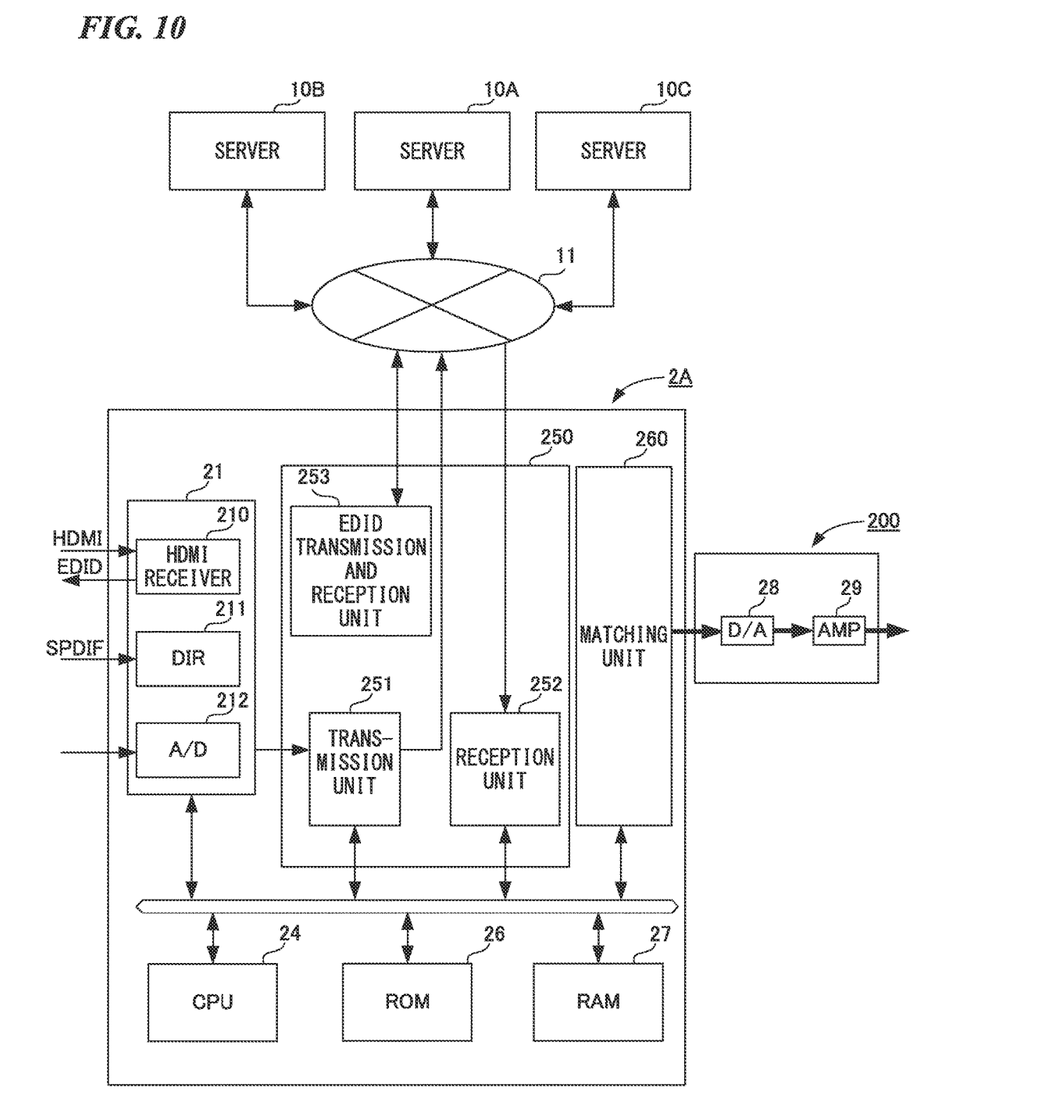
FIG. 10 is a block diagram showing configurations of an adapter and a receiver shown in FIG. 9.

FIG. 10 is a block diagram showing configurations of the adapter 2A and the receiver 200. The adapter 2A may be an example of the signal processing apparatus. The receiver 200 includes a D/A conversion unit 28 that amplifies a received audio signal, and an amplifying unit 29 that amplifies and outputs the signal.

That is to say, the adapter 2A has all the components of the configuration of the receiver 2 shown in FIG. 4 except for the D/A conversion unit 28 and the amplifying unit 29. Consequently, the adapter 2A functions like the receiver 2. That is to say, the adapter 2A transmits a compressed audio signal of content signals received from the player 1, to the server 10, and causes the server 10 to execute processing to convert the compressed audio signal into an audio signal that can be output to the speakers SP. Furthermore, the adapter 2A receives the audio signal from the server 10. Moreover, the adapter 2A supplies the received audio signal to the receiver 200. Also in this case, the adapter 2A can always output the audio signal having been subjected to the latest signal processing (the latest decoding method, the latest sound processing, or the like).

In the present embodiment, a case in which the audio signal is mainly processed has been described. However, it is not limited thereto. The signal processing system according to the present embodiment can also process a video signal in the same manner. When video signals are to be handled, the packet extraction processing unit 241 in FIG. 5 extracts the video signals, the packetizing processing unit 242 converts the signals to packets, and the various servers perform the signal processing of the packets.

INDUSTRIAL APPLICABILITY

The present invention may be applied to a signal processing apparatus and a signal processing method.

REFERENCE SYMBOLS

SP Speaker
1 Player
2 Receiver
10, 10A, 10B, 10C Server
11 Network
13 Communication unit
14 Decoder
15 Sound processing DSP
16 ROM
17 RAM
18 CPU
21 Input unit
24 CPU
26 ROM
27 RAM
28 D/A conversion unit
29 Amplifying unit
250 Communication unit
260 Matching unit

The invention claimed is:

1. A signal processing apparatus communicable via a network with an external device, the signal processing apparatus comprising:
a signal input interface, including at least one of an High Definition Multimedia Interface (HDMI), a Digital audio Interface Receiver (DIR), or an Analog to Digital (A/D) converter, configured to receive inputs of a plurality of compressed audio signals having a temporal order different from each other from a player apparatus;
a processor configured to convert the plurality of compressed audio signals into packets including a packet number different from each other, the packet number corresponding to the temporal order; and
a communication unit including:
a data transmission interface configured to sequentially transmit the packets as data to the external device via the network;
a first data reception interface configured to receive, via the network, a plurality of decoded audio signals from the external device, which processes the data transmitted by the data transmission interface, the plurality of decoded audio signals being obtained by decoding the plurality of compressed audio signals and having the packet number different from each other; and
a second data reception interface configured to receive, from the external device, new processable information including information indicating that an audio signal, from among the plurality of compressed audio signals from the player apparatus, is not processable by the signal processing apparatus, wherein the processor is further configured to arrange the plurality of decoded audio signals in order of the packet number, wherein the signal input interface notifies the player apparatus of processable information indicating that an audio signal, among the plurality of compressed audio signals from the player apparatus, is processable by the signal processing apparatus, wherein the signal input interface notifies the player apparatus of the new processable information, and wherein the plurality of compressed audio signals from the player apparatus are determined as processable based on the new processable information.

2. The signal processing apparatus according to claim 1, further comprising:

an amplifier that amplifies the plurality of decoded audio signals received by the data reception interface; and an output terminal that outputs the plurality of decoded audio signals amplified by the amplifier.

3. The signal processing apparatus according to claim 1, wherein:

the processor is further configured to match the order of output of the plurality of decoded audio signals, the data transmission interface transmits the data to a plurality of external devices, and the first data reception interface receives the plurality of decoded signals from the plurality of external devices.

4. A signal processing method for a signal processing apparatus communicable via a network with an external device, the signal processing apparatus comprising:

a signal input interface, including at least one of an High Definition Multimedia Interface (HDMI), a Digital audio Interface Receiver (DIR), or an Analog to Digital (A/D) converter;

a processor; and a data communication interface including a data transmission interface and a data reception interface, wherein the method comprises the steps of:

receiving, via the network using the signal input interface, inputs of a plurality of compressed audio signals having a temporal order different from each other from a player apparatus;

converting, using the processor, the plurality of compressed audio signals into packets including a packet number different from each other, the packet number corresponding to the temporal order;

sequentially transmitting, using the data transmission interface, the packets as data to the external device via the network;

receiving, via a network using the data reception interface, a plurality of decoded audio signals from the external device, which processes the data transmitted by the data transmission interface, the plurality of decoded audio signals being obtained by decoding the plurality of compressed audio signals and having the packet number different from each other; and arranging, using the processor, the plurality of decoded audio signals in order of the packet number;

notifying the player apparatus of processable information indicating that an audio signal, among the plurality of compressed audio signals from the player apparatus, is processable by the signal processing apparatus;

receiving, from the external device, new processable information including information indicating that an audio signal, among the plurality of compressed audio signals, is not processable by the signal processing apparatus; and notifying the player apparatus of the new processable information, wherein the received plurality of compressed audio signals from the player apparatus are determined as processable based on the new processable information.

* * * * *